US009894464B2

(12) United States Patent
Jain et al.

(10) Patent No.: US 9,894,464 B2
(45) Date of Patent: Feb. 13, 2018

(54) CONVEYANCE OF APPLICATION COMMUNICATION PATTERNS FROM AN EXTERNAL APPLICATION SERVER TO A 3RD GENERATION PARTNERSHIP PROJECT SYSTEM (71) Applicant: Intel IP Corporation, Santa Clara, CA (US)

(72) Inventors: Puneet K. Jain, Hillsboro, OR (US); Sangeetha L. Bangolae, Beaverton, OR (US); Marta Martinez Tarradell, Hillsboro, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 345 days.

(21) Appl. No.: 14/583,168

(22) Filed: Dec. 25, 2014

(65) Prior Publication Data

US 2015/0264512 A1 Sep. 17, 2015

Related U.S. Application Data (60) Provisional application No. 61/953,649, filed on Mar. 14, 2014.

(51) Int. Cl.
*H04W 4/00* (2009.01)
*H04W 88/18* (2009.01)
*H04W 92/24* (2009.01)

(52) U.S. Cl.
CPC ............ *H04W 4/005* (2013.01); *H04W 88/18* (2013.01); *H04W 92/24* (2013.01)

(58) Field of Classification Search
CPC ......... H04W 88/14; H04W 8/02; H04W 4/06; H04W 72/04; H04W 92/24; H04W 4/005; H04W 88/18; H04W 28/0215
See application file for complete search history.

(56) References Cited

U.S. PATENT DOCUMENTS

2013/0115993 A1   5/2013 Jain et al.
2013/0250828 A1*  9/2013 Chou ................ H04W 72/0413
                                          370/311
(Continued)

FOREIGN PATENT DOCUMENTS

WO    2013161233 A1    10/2013
WO    2014022797 A1     2/2014

OTHER PUBLICATIONS

3GPP TR 23.708, "Technical Specification Group Services and System Aspects; Architecture Enhancements for Service Capability Exposure (Release 13)", V0.2.0, Aug. 2014, 11 pages.
(Continued)

*Primary Examiner* — Ian N Moore
*Assistant Examiner* — Brian T Le
(74) *Attorney, Agent, or Firm* — Stoel Rives LLP (57) ABSTRACT A machine type communication interworking function (MTC-IWF) is configured to receive from a service capability exposure function (SCEF), services capability server (SCS), or a third-party application server (AS), application communication pattern information defined by an MTC application and representing characteristics of machine-to-machine (M2M) communications expected from a user equipment (UE) machine type communication (MTC) device. The MTC-IWF being configured to communicate the information to a mobility management entity (MME) that thereby provides core network (CN) originated assistance to an evolved universal terrestrial radio access network node B (eNB). Disclosed are embodiments for providing the information in the form of Diameter-based messages communicated through Tsp, T5, and other interfaces, or through an application programming interface (API) exposed by the SCEF, SCS, or MTC-IWF.

16 Claims, 7 Drawing Sheets (56) References Cited

U.S. PATENT DOCUMENTS

| | | | | |
|---|---|---|---|---|
| 2013/0308564 A1* | 11/2013 | Jain | ............... | H04B 15/00 370/329 |
| 2014/0307632 A1* | 10/2014 | Kim | ............... | H04W 4/005 370/328 |
| 2014/0349614 A1* | 11/2014 | Starsinic | ............... | H04L 63/0876 455/411 |
| 2015/0117347 A1 | 4/2015 | Iwai | | |
| 2015/0341889 A1* | 11/2015 | Starsinic | ............... | H04W 4/005 370/329 |
| 2016/0218843 A1* | 7/2016 | Inoue | ............... | H04W 48/08 |

OTHER PUBLICATIONS

3GPP TR 23.887, "Technical Specification Group Services and System Aspects; Study on Machine-Type Communications (MTC) and other mobile data applications communications enhancements (Release 12)", V12.0.0, Dec. 2013, 151 pages.

3GPP TS 29.368, "Technical Specification Group Core Network and Terminals; Tsp interface protocol between the MTC Interworking Function (MTC-IWF) and Service Capability Server (SCS) (Release 12)", V12.0.0, Mar. 2014, 28 pages.

Intel, et al., "Service Capability Exposure Architecture (Change Request)", S2-144432, 3GPP TSG-SA2 Meeting #106, San Francisco, United States, Nov. 17-21, 2014, 5 pages.

PCT/US2015/015778, International Search Report and Written Opinion, dated Jun. 1, 2015, 17 pages.

ZTE, "Device Trigger Information", S2-120650, SA WG2 Meeting #89, Vancouver, Canada, Agenda Item 9.7.4, Feb. 6-10, 2012, 6 pages.

\* cited by examiner

CONVEYANCE OF APPLICATION COMMUNICATION PATTERNS FROM AN EXTERNAL APPLICATION SERVER TO A 3RD GENERATION PARTNERSHIP PROJECT SYSTEM

RELATED APPLICATION

The present application claims benefit of U.S. Provisional Patent Application No. 61/953,649, filed Mar. 14, 2014, which is incorporated herein by reference in its entirety.

TECHNICAL FIELD

This disclosure relates generally to the field of wireless communications and devices.

BACKGROUND INFORMATION

Machine type communication (MTC), also called machine-to-machine (M2M) communication, is of interest to mobile network operators, equipment vendors, MTC specialist companies, and research bodies. M2M communications enable M2M components to be interconnected, networked, and controlled remotely with low-cost scalable and reliable technologies. Given the wide array of possibilities of MTC applications and devices, it is expected that there can be trillions of M2M communications with small data to transfer. Such M2M communications could be carried over mobile networks, in which case the role of the mobile network is largely confined to serve as a transport network.

A user equipment device (or simply, UE) used as an MTC device for MTC communications in MTC applications (or simply, MTC) has characteristics such as being nomadically (re-)deployed, having low mobility while deployed, proving low priority communications, and infrequently sending small amount of mobile originated (MO) or mobile terminated (MT) data. For example, a smart meter for utility metering applications is a type of UE used as an MTC device (referred to generally as a UE).

DETAILED DESCRIPTION OF EMBODIMENTS

3rd Generation Partnership Project (3GPP) standards setting discussions—specifically, meeting discussions at the February 2014 radio access network (RAN) working group 2 (RAN2) #85 meeting—led to the development of a form of core network (CN) originated assistance information now specified in 3GPP standards including 3GPP Technical Specification (TS) numbers 23.401 (version 13.0.0), 36.413 (version 12.3.0), and 36.423 (version 12.3.0). For example, 3GPP TS 23.401 describes CN assisted evolved universal terrestrial radio access network node B (also known as evolved node B, abbreviated as eNodeB or eNB) parameters tuning as aiding the eNB in minimizing the UE state transitions so as to achieve optimum network behavior. Accordingly, an MME supporting this CN assisted eNB parameters tuning feature is capable of providing to the eNB, per each UE, CN assistance information, such as, for example, the following data: an average time in evolved packet system (EPS) connection management (ECM) ECM-CONNECTED and ECM-IDLE states, and/or a number of eNB handover procedures per hour.

CN assistance information would aid a mobile network and an eNB in making efficient radio resource management (RRM) related decisions for different UEs, and would address certain deficiencies of other proposals for CN assistance.

One such recent proposal of 3GPP technical report (TR) number 23.887 (version 12.0.0), titled, "3rd Generation Partnership Project; Technical Specification Group Services and System Aspects; Study on Machine-Type Communications (MTC) and other mobile data applications communications enhancements (Release 12)," addresses MTC and other mobile data applications communications enhancements (MTCe)-small data and device trigger enhancements (SDDTE) for release no. 12 (Rel-12) of the 3GPP standardization. The proposal of the 3GPP TR 23.887 document includes a discussion of an attempt for providing CN assistance parameter tuning. But this attempt would rely on a traffic pattern parameter that is provided statically to the CN as part of a UE's network subscription information. Therefore, a drawback of this approach is that the CN assistance parameter tuning information would be static, whereas an application communication pattern can change dynamically.

Furthermore, dynamic updates of application communication pattern information, examples of which are set forth in table 1 below, would facilitate efforts of the system aspects working group one (SA1) work item description (WID) study on service exposure and enablement support (SEES) to define for release no. 13 (Rel-13) of the 3GPP standardization new techniques that would use dynamic exchange of application communication pattern. As an aside, skilled persons will recognize that an application communication pattern may be described using the following synonyms: traffic activity, inactivity, flow, pattern, or other descriptions of traffic information including (application) traffic pattern configuration information or data; and description(s) of related MTC application or service characteristics.

TABLE 1

Example Application Communication Pattern Information

| Characteristic | Example |
| --- | --- |
| traffic type | periodic, random, or emergency |
| traffic direction | downlink, uplink, or bidirectional |
| Inter-Arrival Time (IAT) between activity periods or bursts of traffic | Periodicity value of traffic or service defined in terms of, for example, a single value, range, or average. |

TABLE 1-continued

Example Application Communication Pattern Information

| Characteristic | Example |
| --- | --- |
| Sub-IAT or Intra-Arrival Time between individual packet | This characteristic may depend on expected packet sizes and their frequency within an active transmission period (also could be defined as a single value, range, or average). |
| packet size/length | Length of the traffic in terms of bytes, which may refer either to individual packets or a burst of packets. |
| time window allowed to transmit the packets or data in general | Based on the delay tolerance limit or quality index/priority of the packets/application/service; defined in terms of, for example, a single value, range, or average. |
| application or service quality of service | Quality measure defined in terms of an index value referring to the priority of the application for delay requirement or other pre-defined requirement. |
| application or service priority | This information may be provided in a Priority-Indication attribute value pair (AVP) (as shown in table 4), being of type enumerated, and may be reused to also provide the priority of the traffic pattern. |
| Application-Port-Identifier AVP | This information (AVP code 3010, table 4) is of type unsigned32 and may be used to uniquely identify a triggering application addressed in a device, as described in 3GPP TS 23.040 (version 12.2.0) subclause 9.2.3.24.4. |
| other application communication characteristics | |

The foregoing table of application communication pattern information should not be considered as limiting—there are various kinds of information that could be conveyed. Nor should application communication pattern information be construed as requiring the specific structure or arrangement of information set forth in table 1. For example, each item of table 1 could be included as a standalone information element (IE) in a Diameter-based AVP, or multiple items may be included in a structure that includes several nested items of information. In addition, some MTC applications may communicate the information as a single group of elements, or several elements, that reflect characteristics of different applications or services. And the information may be nested so that it refers to several discrete groups or categories of applications.

To facilitate CN assistance of an MME to a RAN, this disclosure describes embodiments for dynamically communicating application communication pattern information from a third-party application server (AS) to a 3GPP system. The application communication pattern information may be communicated from the AS to an SCS or SCEF (SCS/SCEF) in communication with an MTC-IWF of a CN, and then from the MTC-IWF to an MME or other CN entity having a trigger submission interface (e.g., T5 reference point) with the MTC-IWF so that a UE's traffic activity (or generally, communication) pattern information, as determined by an MTC server, is made available to an MME of a CN providing assistance information to an eNB. In other words, communication pattern information—which may include (in)activity information and services characteristics derived based on an MTC server's expected or pre-configured MTC applications for the UE—may be made available to an MME for providing CN assistance information to the eNB for radio resource control purposes.

Skilled persons will recognize that both MME and serving general packet radio service (GPRS) support node (SGSN) functionality can be implemented on either a single hardware device or as separate network entities (i.e., separate devices). For conciseness, therefore, an MME and SGSN may be referred to generally as an MME/SGSN, by which the "/" connotes an inclusive disjunction, e.g., meaning an MME, an SGSN, or a combination of both an MME and an SGSN. Likewise, the "/" inclusive disjunction notation is used for other network entities, interfaces, and functions that are similar to each other and can therefore be embodied as one or multiple devices. The "/" used in the description of the SCEF/SCS mentioned in the previous paragraph is one such example. Thus, the phrase "A/B" means (A), (B), or (A and B), which is synonymous with the phrase "A and/or B". And the phrase "at least one of A, B, and C" means (A), (B), (C), (A and B), (A and C), (B and C), or (A, B, and C).

In some examples of this disclosure, existing message formats are modified for supporting transfer of application traffic pattern configuration information. In other examples, new information fields and elements of messages are described for communicating the traffic pattern configuration data. Additional aspects and advantages will be apparent from the following detailed description of embodiments, which proceeds with reference to the accompanying drawings.

Figure 1:
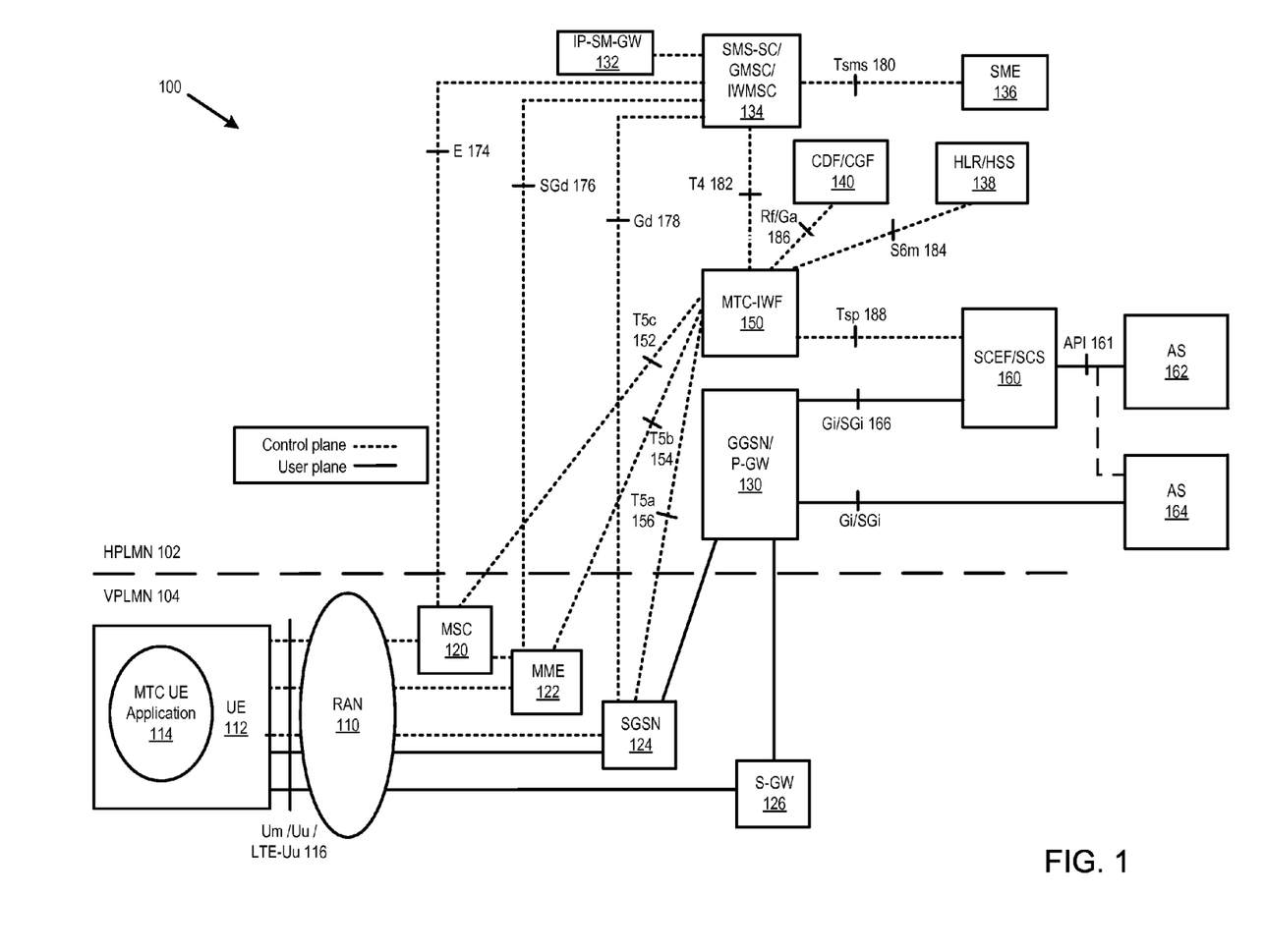
FIG. 1 is a block diagram showing a wireless network architecture for MTC communication.

FIG. 1 illustrates an example wireless network system 100 architecture showing entities of an evolved packet core (EPC), i.e., the core network of a long-term evolution (LTE) system, for supporting MTC or M2M communications. System 100 may be divided into a home public land mobile network (HPLMN) 102 and a visited public land mobile network (VPLMN) 104, as indicated by the long-dashed line of FIG. 1.

The system 100 includes a RAN 110 that may be capable of providing a UE 112 access to a mobile communications network. UE 112 may include an MTC UE application 114. A Um/Uu/LTE-Uu interface 116 at UE 112 may provide a signaling interface between a domain of UE 112 and an access domain associated with or managed by RAN 110. RAN 110 may be coupled to a mobile switching center (MSC) 120, an MME 122, an SGSN 124, and a serving gateway (S-GW) 126.

In some examples, MSC 120 may act like a switching node within a public switched telephone network (PSTN) or an integrated services digital network (ISDN) and may also provide additional functionality to enable support of a mobile user or a UE such as UE 112. The additional functionality may include registration, authentication, call location, inter-MSC handovers, and call routing to the mobile subscriber or UE.

According to some examples, MME 122 may be arranged as a control-node and may be responsible for idle mode UE tracking and paging procedures including retransmissions. MME 122 may be involved in bearer activation or deactivation processes and may also be responsible for choosing S-GW 126 for UE 112 upon initial attach and at time of intra-LTE handover involving CN node relocation.

In some examples, SGSN 124 may be responsible for the delivery of data packets from and to UEs within its geographical service area. For these examples, SGSN 124 handles packet routing and transfer, mobility management (attach/detach and location management), logical link management, and authentication and charging functions.

S-GW 126 may route and forward user data packets, while also acting as a mobility anchor for a user plane during inter-eNB handovers and as an anchor for mobility between LTE and other 3GPP technologies. According to some examples, as shown in FIG. 1, S-GW 126 may be coupled to a gateway GPRS support node/packet gateway (GGSN/P-GW) 130. For these examples, GGSN 130 may manage internetworking between a GPRS network and external packet switched networks, like the Internet or X.25 networks. GGSN 130 may also enable mobility of a user terminal in GPRS/universal mobile telecommunications system (UMTS) networks and may maintain routing to tunnel protocol data units (PDUs) for servicing a particular UE such as UE 112. P-GW 130 may provide connectivity from UE 112 to external packet data networks by being a point of exit and entry of traffic for UE 112. P-GW 130 may perform policy enforcement, packet filtering for a UE such as UE 112, charging support, lawful interception, and packet screening. P-GW 130 may also act as an anchor for mobility between 3GPP and non-3GPP technologies, such as WiMAX and 3GPP2.

In some examples, MSC 120, MME 122, and SGSN 124 may be coupled to an MTC-IWF 150, which could be a standalone entity or a functional entity of another network element. MTC-IWF 150 may interface with other 3GPP entities for providing various MTC services. For example, MTC-IFW 150 may support device trigger functionality over Tsp and T4 reference points, as described in 3GPP TS 29.368, titled, "Tsp interface protocol between the MTC Interworking Function (MTC-IWF) and Service Capability Server (SCS)" (version 12.0.0), and may generate charging data records (CDRs) for supported device triggers. Although examples described herein primarily concern device or trigger messages, other types of messaging may also be used according to other examples, such as small data transmissions, or other types of messaging.

According to some examples, as shown in FIG. 1, MTC-IWF 150 may be coupled to a charging data function/charging gateway function (CDF/CGF) 140, a 3GPP home location register (HLR) or home subscriber server (HSS) 138, and a short message service-service center/gateway mobile switching center/interworking mobile switching center (SMS-SC/GMSC/IWMSC) 134. For these examples, charging function addresses may be addresses distributed to internet protocol (IP) multimedia subsystem (IMS) entities and provide a common location for an entity to send charging information. CDF addresses are used for offline billing and Online Charging Function (OCF) is used for online billing. CDF 140 may collect accounting information and build a Call Detail Record (CDR), which is sent to the billing system (BS) of the domain. CGF 140 may listen to messages providing charging data that may be sent from GPRS support nodes (GSNs). CGF 140 may retrieve CDRs from the GSNs. HSS 138 may maintain a master database for a given user. HSS 138 may be the entity maintaining subscription-related information to support those network entities actually handling calls/sessions.

MTC-IWF 150 resides in HPLMN 170, hides the internal public land mobile network (PLMN) topology, and relays or translates information sent over Tsp to invoke specific functionality in a PLMN. Some of the other functionalities of MTC-IWF 150 include the following: terminates Tsp, S6m, T4, and Rf/Ga reference points; supports ability to authorize an SCS before communication establishment with the 3GPP network; and supports ability to authorize control plane requests from an SCS.

SMS-SC/GMSC/IWMSC 134 optionally includes SMS-SC, SMS-GMSC, and SMS-IWMSC. SMS-SC 134 may act as a store and forward center for SMS messages. SMS-GMSC 134 and SMS-IWMSC 134 may connect SMS-SC 134 to the GPRS network. SMS-GMSC 134 and SMS-IWMSC 134 may be connected to the SGSN through Gd interface 178 to enable GPRS UEs such as UE 112 to send and receive SMS messages through, for example, SGSN 124. SMS-IWMSC 134 may receive SMS messages from a PLMN and submit these SMS messages to a receiving SMS-SC such as SMS-SC 134. According to some examples, as shown in FIG. 1, SMS-SC/GMSC/IWMSC 134 may also be coupled to MSC 120 via E interface 174 and to MME 122 via SGd 176. SMS-SC/GMSC/IWMSC 134 may be further coupled to an Internet Protocol-Short-Message-Gateway (IP-SM-GW) 132 and short message entities (SME) 136. IP-SM-GW 132 may provide the protocol interworking for submission of short messages. SME 136 may include network entities, e.g., mobile stations, cell phones, and UEs, that can send/receive short messages.

According to some examples, MTC-IWF 150 may be further coupled to an SCEF/SCS 160. SCEF/SCS 160 is the entity that connects MTC ASs (as defined outside of the scope of the 3GPP standardization) to the 3GPP network to enable them to communicate through specific 3GPP defined services with UEs used for MTC, and with MTC-IWF 150 in HPLMN 102. For example, SCEF/SCS 160 exposes an application programming interfaces (APIs) 161 that offers capabilities for use by one or multiple MTC ASs. Accordingly, SCEF/SCS 160 may connect MTC ASs such as an AS 162 to the 3GPP network to enable these ASs to communicate through specific 3GPP defined services with UE 112 and MTC-IWF 150. SCEF/SCS 160 may offer capabilities for use by one or multiple ASs, such as AS 162. Other types of ASs such as AS 164 may couple to GGSN/P-GW 130. As shown in FIG. 1, AS 164 may connect directly to the 3GPP network in order to perform direct user plane communications with UE 112 without use of SCEF/SCS 160. However, SCEF/SCS 160 may provide value added services for MTC and perform user plane and/or control plane communication with UE 112. Additional details of SCEF/SCS 160 are discussed in subsequent paragraphs, with reference to FIG. 5.

In some examples, a Tsp interface such as Tsp interface 188 may function as an inter-domain interface for control plane communication. For these examples, Tsp interface 188 may be used for SCEF/SCS 160 to deliver a device trigger request included in a trigger message to MTC-IWF 150 and thus may allow MTC-IWF 150 to receive device trigger requests from SCEF/SCS 160. In some examples, a Tsp interface such as Tsp interface 188 may also be implemented as an API or set of APIs.

According to some examples, Tsms interface 180 may be used to send a trigger message to an MTC UE such as UE 112. The trigger message may be encapsulated in an MT short message service (MT-SMS) message as an over-the-top application by any network entity (e.g., SCEF/SCS 160) acting as an SME.

A T4 interface 182 may be used to transfer a trigger message from MTC-IWF 150 to SMS-SC 134, provides serving node information corresponding to an international mobile subscriber identity (IMSI), and reports the success or failure of delivering the trigger message to UE 112.

An S6m interface 184 may map mobile subscriber integrated services digital network-number (MSISDN) or external identifier (external-Id) assigned to or associated with UE 112 to IMSI. The map to MSISDN or external-Id may resolve serving node identities of UE 112.

According to some examples, as shown in FIG. 1, T5a 156, T5b 154, and T5c 152 reference points may connect MTC-IWF 150 to serving SGSN 124, MTC-IWF 150 to serving MME 122, or MTC-IWF 150 to serving MSC 120, respectively. T5a 156, T5b 154, and T5c 152 reference points may also support device trigger functionality including transfer of a device trigger request included in a trigger message to MSC 120, MME 122, or SGSN 124, reporting to MTC-IWF 150 the success or failure of delivering the trigger message to UE 112, or providing MME 122/SGSN 124 congestion/load information to MTC-IWF 150.

Gi/SGi interface 166 may provide an interface into packet data networks (PDNs). SGi 166 may be an interface to an IP PDN and Gi 166 may be an interface to an external PDN (e.g., Internet) and may contain an end-user's IP point of presence. Rf/Ga interface 186 may provide an interface between MTC-IWF 150 and CDF/CGF 140. In some examples, Rf interface 186 may provide access to CDF 140 of CDF/CGF 140 and Ga interface 186 may provide access to CGF 140 of CDF/CGF 140.

In some examples, end-to-end services between the MTC applications at UE 112 (e.g., MTC UE application 114) and MTC or M2M applications provided at AS 162 in an external network may use services provided by a 3GPP system, and optionally services provided by SCEF/SCS 160. For these examples, the 3GPP system may provide transport and communication services, including 3GPP bearer services, e.g., IMS and SMS, and various optimizations, that can facilitate MTC or M2M types of services. As mentioned above, SCEF/SCS 160 may couple AS 162 to the 3GPP network to enable AS 162 to communicate through specific 3GPP defined services with UE 112 and with MTC-IWF 150.

The Diameter Base Protocol as specified in Request for Comments (RFC) 3588, published in September 2003 by the Internet Engineering Task Force (IETF), is a protocol used by the network entities of FIG. 1 to communicate commands and information between the entities. Thus, the Diameter Base Protocol provides a foundation for various commands of the 3GPP standardization, examples of which are shown in the following table 2. These commands are specified in the aforementioned 3GPP TS 29.368 document for communications over a Tsp interface and are identified by Internet Assign Number Authority (IANA) Diameter Header code values as Device-Action-Request (DAR), Device-Action-Answer (DAA), Device-Notification-Request (DNR), and Device-Notification-Answer (DNA) commands.

TABLE 2

Command-Code Values for Tsp

| Command Name | Abbreviation | IANA Code |
| --- | --- | --- |
| Device-Action-Request | DAR | 8388639 |
| Device-Action-Answer | DAA | 8388639 |
| Device-Notification-Request | DNR | 8388640 |
| Device-Notification-Answer | DNA | 8388640 |

An example DAR command message definition is shown in the following table 3. The IANA Command-Code field in the DAR message is the numeric code number 8388639 with the 'R' bit set in the Command Flags REQ field so as to identify the message as a request message. Table 3 also shows a list of various AVPs that are included in the DAR command, or the other commands, listed in table 2.

TABLE 3

DAR Command Definition with Overloaded and Additional AVP Fields for Application Communication Pattern Information

| Command Definition | < header >, < fixed >, { required }, and [ optional ] |
| --- | --- |
| < DA-Request > ::= | < Diameter Header: 8388639, REQ, PXY > |
| | < Session-Id > |
| | { Auth-Application-Id } |
| | { Auth-Session-State } |
| | { Origin-Host } |
| | { Origin-Realm } |
| | { Destination-Realm } |
| | [ Destination-Host ] |
| | [ Origin-State-Id ] |
| | [ Device-Action ] |
| | *[ Proxy-Info ] |
| | *[ Route-Record ] |
| | *[ Supported-Features ] |
| | *[ ATCI Container ] |
| | *[ AVP ] |

*denotes elements that may have 0 or 1 instances

A portion the AVPs shown in table 3 are Tsp-specific Diameter AVPs as specified in the aforementioned 3GPP TS 29.368 document. Other additional AVPs, which are the subject of this disclosure, are updated or added for supporting the conveyance of application communication pattern information. For example, the Device-Action AVP may be used by SCEF/SCS 160 to request that MTC-IWF 150 report application communication pattern information to MME 122, as described below for FIG. 2. For these examples, Device-Action (or Device-Notification) AVPs may have values set to provide information relevant to the DAR (DAA) commands and may further have Action-Type AVPs to indicate a particular application communication pattern configuration. The Application-Traffic-Configuration-Information (ATCI) AVP is another optional AVP that may be suitable for this purpose. Thus, application communication pattern data delivered between MTC-IWF 150 and SCEF/SCS 160 may be provided in the form of AVPs having pre-defined values in the AVP payload that represent the data. Hence, existing DAR/DAA/DNR/DNA command messages may be updated with AVPs suitable for communicating application communication pattern information to thereby transfer, over a Tsp interface from SCEF/SCS 160 to MTC-IWF 150 and over T5b interface 154 from MTC-IWF 150 to MME 122, newly defined application-related configuration data in a message payload.

Figure 2:
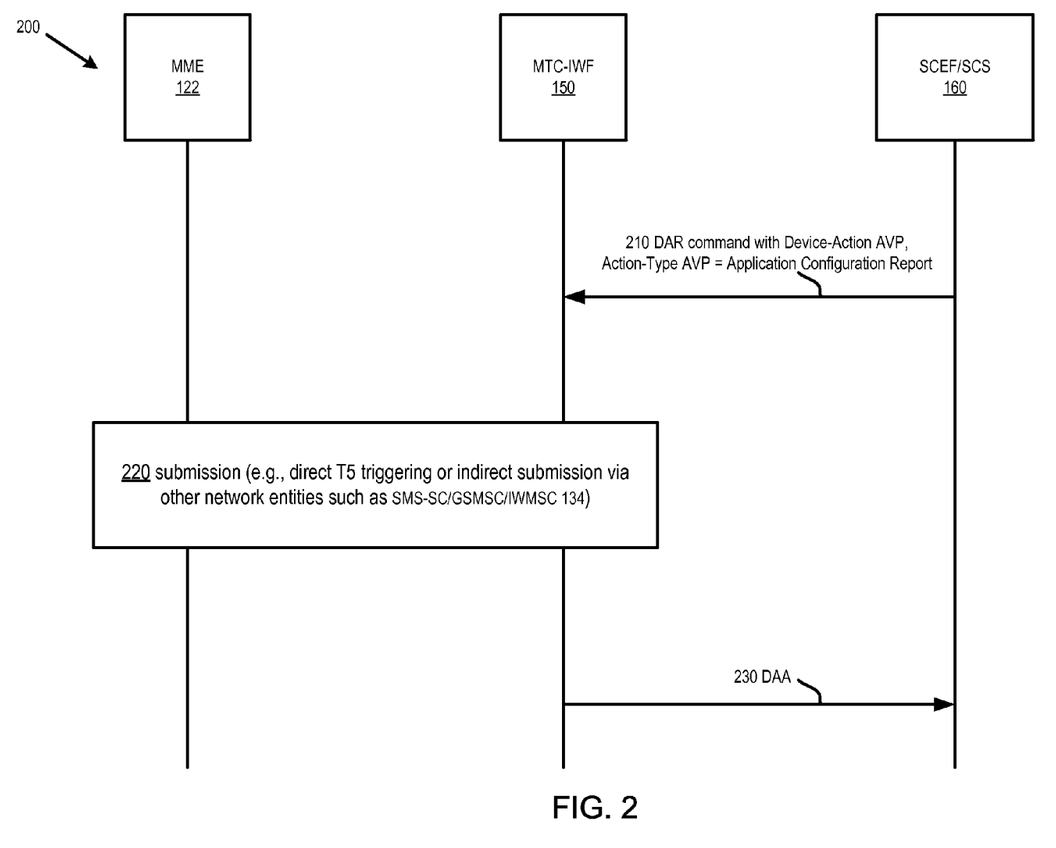
FIG. 2 is a message sequence flow diagram showing a sequence of Diameter-based commands communicated over Tsp and T5b interfaces.

FIG. 2 shows an example message sequence 200 using Tsp and T5 triggering for communicating application communication pattern information to MME 122 using updated DAR and DAA messages. SCEF/SCS 160 sends 210 a DAR command message to MTC-IWF 150 as part of the device action request procedure. The DAR command has one or more AVP values within the Device-Action AVP for communicating the application communication pattern information. For example, the Device-Action AVP has an Action-Type AVP set to a value (e.g., a value of 5, or some other value) representing an Application Configuration Report. MTC-IWF 150 receives the DAR command from SCEF/SCS 160 and then submits 220 the information to MME 122 using T5 triggering, as is described in 3GPP TS 23.682 (e.g., version 12.2.0), or another indirect submission technique that may entail submission via another entity such as SMS-SC/GSMSC/IWMSC 134. MTC-IWF 150 then reports 230 to SCEF/SCS 160 via a DAA command acceptance or non-acceptance of the request, or success or failure of the request, if known, and may provide load control information to SCEF/SCS 160 as part of the response to the DAR command.

Although not shown on FIG. 2, skilled persons will recognize that T5 triggering may be initiated from an MTC application at AS 162, which communicates with SCEF/SCS 160 to initiate the T5 triggering. SCEF/SCS 160 may then transmit a DAR command that may include a request for T5 triggering to MTC-IWF 150 via the Tsp interface 188.

In another embodiment, rather than updating an existing Diameter command, an additional command may be defined for communicating application communication pattern information over Tsp and T5 interfaces. Accordingly, instead of extending the existing DAR command and other commands for communicating application communication pattern information, a new message such as a Device-Information-Report (DIR), Application-Information-Report (AIR), Application-Traffic-Configuration-Information (ATCI), or a similarly named command (not limited to the aforementioned names) may be defined as having a new IANA code and a similar format as that of the DAR command set forth in table 3.

Figure 3:
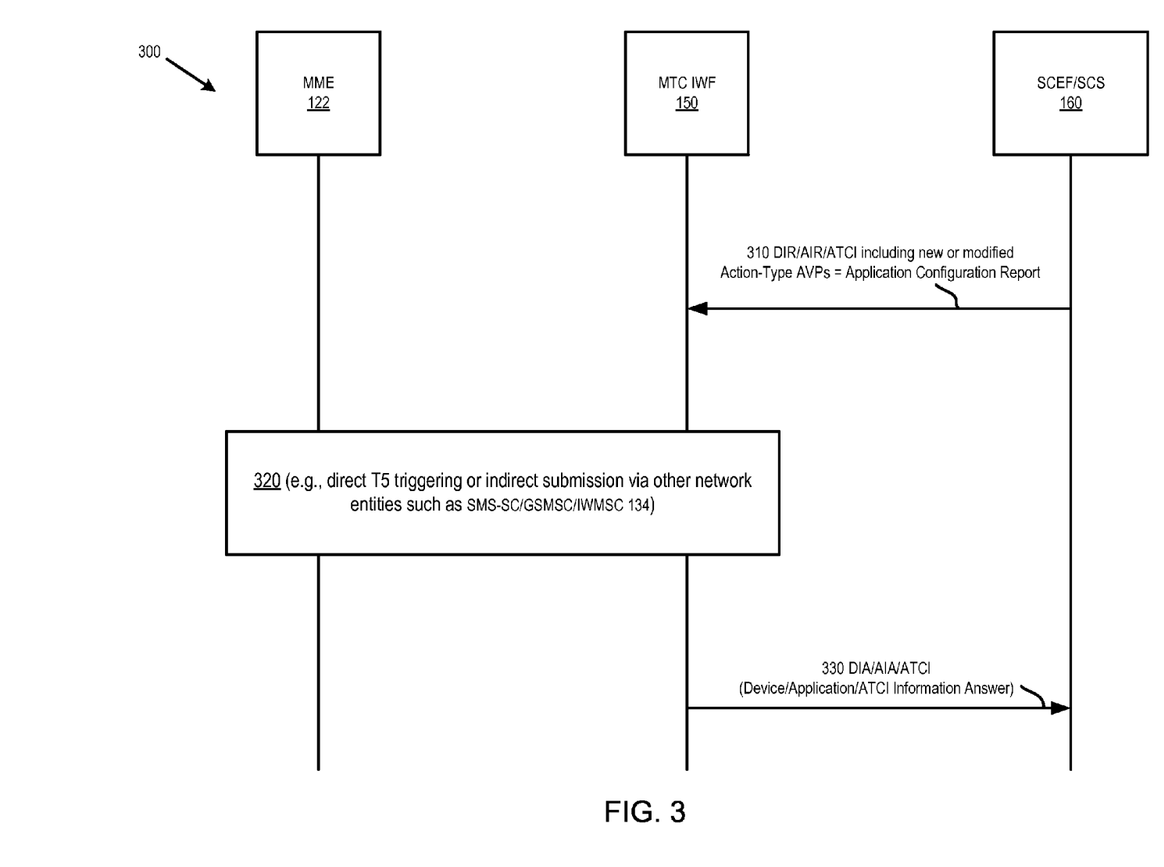
FIG. 3 is a message sequence flow diagram showing another sequence of Diameter-based commands communicated over Tsp and T5b interfaces.

FIG. 3 shows a message sequence 300 using a DIR, AIR, or ATCI command. SCEF/SCS 160 sends 310 a DIR, AIR, or ATCI command, in which a suitable Action-Type AVP (as explained with respect to FIG. 2) may be included, if necessary, as part of the Device-Action AVP or similar AVP. MTC-IWF 150 submits 320 (directly over T5b interface 154 or indirectly via other entities) to MME 122 the DIR, AIR, or ATCI command that includes application communication pattern information (e.g., in an AVP payload or ATCI command) received from SCS 150. In response, MTC-IWF 150 reports 330 the result of the submission 320 in a Device-Information-Answer (DIA), Application-Information-Answer (AIA), ATCI, or a similarly named command (not limited to the aforementioned names) defined as having a new IANA code.

In some embodiments, MTC-IWF 150 may simply forward the information to MME 122, or MTC-IWF 150 may perform some processing or mapping to convey the information in another format more appropriate for MME 122. For example, regarding the ATCI command shown in FIG. 3, the new command may have a format that does not incorporate any previously defined AVPs, such that the new command stands alone as a self-sufficient mechanism for communicating application communication pattern information. In such a case, MTC-IWF 150 may need not process the information or otherwise map it to any pre-defined AVPs.

Regardless of whether a new command stands alone, new AVP configurations, discussed below, may be used to communicate application communication pattern information. An example list of AVPs to be provided by either a modified DAR/DAA/DNR/DNA command or a new DIR/AIR/ATCI command is as follows.

An Action-Type AVP is set to a newly defined value (e.g., a value of five) representing a Device Information Report or an existing applicable type value may be reused for the purpose of indicating the Diameter-based command is for providing application communication pattern information.

Either the MSISDN AVP or the External-Id AVP may be set to an identifier of the MTC device (e.g., UE 112, FIG. 1) for which the application communication pattern information report is made available.

SCS-Identifier AVP contains an identity of the SCS (e.g., SCEF/SCS 160) providing the information report of the UE.

Reference-Number AVP contains a newly assigned reference number that the SCS has assigned to the specific information report.

Validity-Time AVP indicates the validity time of the information report since the time the device action request has been received by the MTC-IWF.

Configuration-Data AVP (or so-called ATCI AVP) contains, within the report to the MTC-IWF, data to be sent to the MME (e.g., MME 112). This AVP may include multiple AVPs, such as a Payload AVP, any specific priority of the information in the Priority-Indication AVP, and the corresponding application indicated in the Application-Port-Identifier AVP. The ATCI AVP may be a grouped AVP and have further AVPs nested within it, as described with reference to table 1.

The new container or Payload AVP used to convey information related to the device, service communication pattern, or application or a set of applications could refer to configuration, characteristics, setting, or information of the device, service, traffic, or application or a set of applications. For simplicity, the new container or Payload AVP is referred to herein generally as ATCI; however, this name should not be considered as limiting the scope of this container that could also be used to convey other kinds of device, service, or application characteristic.

The new ATCI container may be defined as: one or more of the AVP types, as specified in 3GPP standards and reproduced in the following table 4, which includes Tsp-specific Diameter-based AVPs of the aforementioned 3GPP TS 29.368 document, or a new ATCI AVP created to fully or partially map application communication pattern information noted in table 1. Furthermore, this new ATCI AVP could be mapped to any type of AVP. For example, the new ATCI container may be mapped to a Traffic-Data AVP or a similarly functioning "Service-Characteristic" AVP and defined as Grouped or OctetString value type. In other words, the AVP code may refer to one of the current ones or a newly defined code.

TABLE 4

Tsp-Specific Diameter AVPs

| Attribute Name | AVP Code |
| --- | --- |
| Device-Action | 3001 |
| Device-Notification | 3002 |
| Trigger-Data | 3003 |
| Payload | 3004 |
| Action-Type | 3005 |
| Priority-Indication | 3006 |
| Reference-Number | 3007 |
| Request-Status | 3008 |
| Delivery-Outcome | 3009 |
| Application-Port-Identifier | 3010 |
| Old-Reference-Number | 3011 |
| TBD | 300x |

Figure 4:
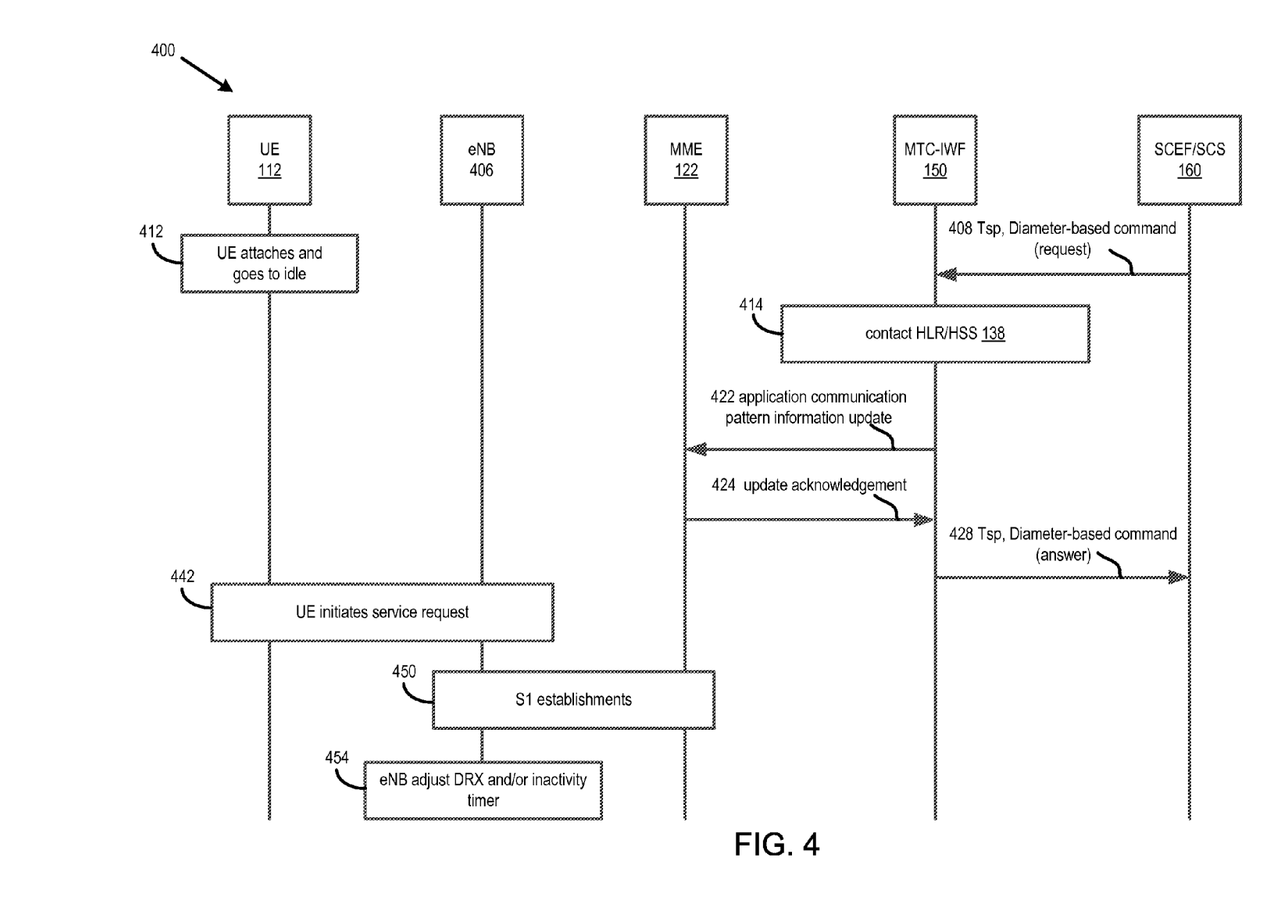
FIG. 4 is a message sequence flow diagram according to another embodiment.

FIG. 4 shows a message sequence 400 employing Diameter-based commands shown in FIG. 2 or FIG. 3, but it also shows additional details of MME 122 decoding application communication pattern information and transferring that information to an eNB 406 in the form of assistance information (depending on the specific internal implementation). A general overview of the transfer is described in the following paragraphs. Additional aspects of the communication exchange between MME 122 and eNB 406 are described in existing 3GPP TS documents, such as 3GPP TS 36.413 (version 12.3.0), which is the S1 application protocol (S1AP) related specification concerning aspects of the aforementioned communication between eNB and MME.

Initially, as shown in FIGS. 2 and 3 SCEF/SCS 160 transmits 408 over Tsp interface 188 a Diameter-based request message. Transmission 408 may be similar to that of FIG. 2, in which case SCEF/SCS 160 transmits 210 a modified DAR or DNR command, or transmission 408 may be similar to that of FIG. 3, in which case SCEF/SCS 160 transmits 310 a new DIR, AIR, or ATCI command.

In response to receiving the transmission 408, MTC-IWF 150 contacts 414 HLR/HSS 138 for authorization and obtaining IMSI and serving node information. Contemporaneously, or previously, UE 112 attaches 412 to the system 100 (FIG. 1) and goes to an idle state. As shown in FIG. 4, UE 112 is attached, but if UE 112 is not connected (e.g., MTC-IWF 150 is unable to derive serving MME information), then MTC-IWF 150 may temporarily store application communication pattern information or may reject the request transmitted 408 from a third-party server, such as SCEF/SCS 160 (or AS 162). When rejected, a third-party server may optionally attempt the request again at another time.

T5 trigger submission is represented by an application communication pattern information update 422, and an acknowledgement is provided by MME 122 in an update acknowledgement 424. Skilled persons, however, will understand that MTC-IWF 150 may use other mechanisms for accomplishing update 422 and acknowledgement 424. For example, in some embodiments, MTC-IWF 150 may communicate the information report to P-GW 130 using another new interface that may be defined. And S-GW 126 may convey the information to MME 122 using a downlink data notification (DDN) message described in 3GPP TS 29.274 (version 12.6.0).

In response to MTC-IWF 150 receiving acknowledgement 424, it transmits 428 over Tsp interface 188 a Diameter-based answer message. Transmission 428 may be similar to that of FIG. 2, in which case MTC-IWF 150 transmits 230 a modified DAA or DNA command, or transmission 428 may be similar to that of FIG. 3, in which case MTC-IWF 150 transmits 330 a new DIA, AIA, or ATCI command.

As an MTC device, UE 112 eventually initiates 442 a service request from eNB 406. The service request may be a MO service request, or it may be in response to paging. In response to the service request, during S1 establishment 450, eNB 406 receives from MME 122 application communication pattern information associated with an MTC application for UE 112. In some embodiments, MME 122 possesses logic that prevents it from updating eNB 406 too frequently. For example, MME 122 may send application communication pattern information to eNB 406 after certain S1 establishment (e.g., as shown in FIG. 4 and described in 3GPP TS 36.413) or based on timer value.

In response to receiving application communication pattern information, eNB may adjust 454 discontinuous reception (DRX) and/or an inactivity timer that controls when UE 112 is activated to receive downlink subframes.

Figure 5:
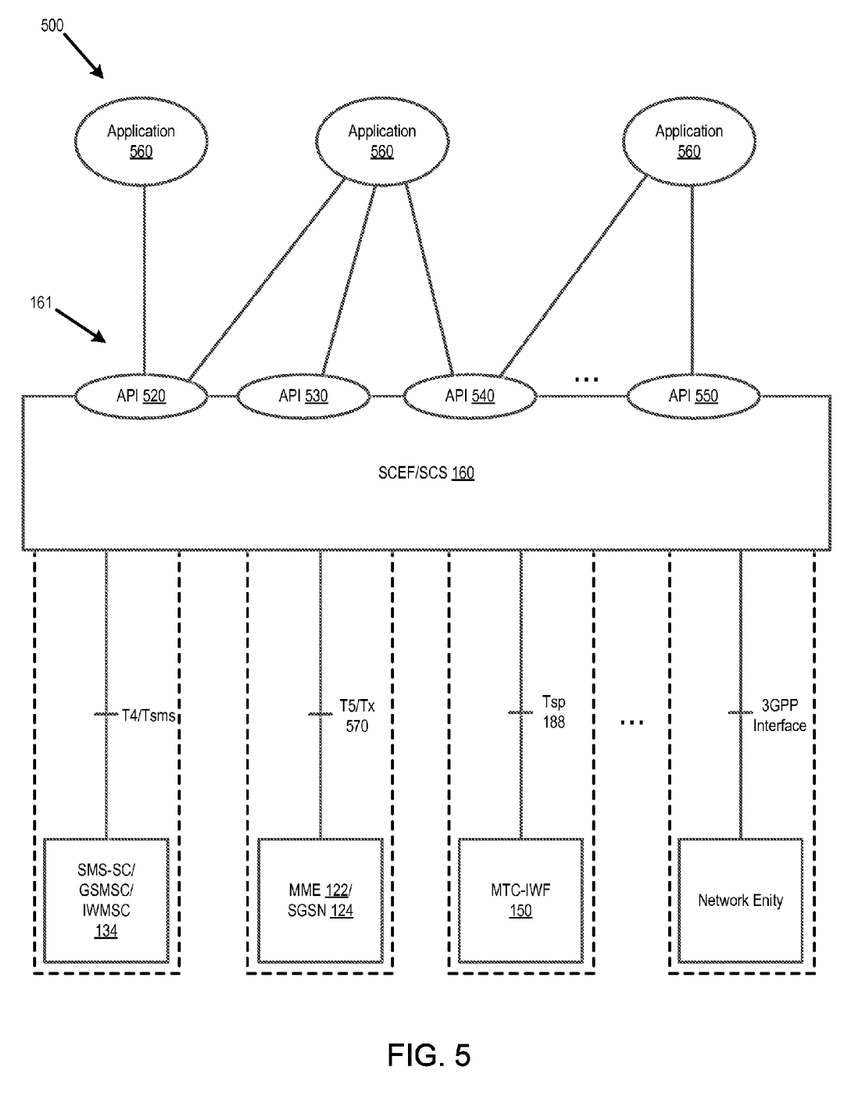
FIG. 5 is a block diagram showing a wireless network architecture for MTC communication.

FIG. 5 shows another network system 500 architecture embodiment in which exchange of application communication pattern information is provided by APIs 161 exposed at SCEF/SCS 160, and accessible to MTC-IWF 150 or other entities communicating directly or indirectly with SCEF/SCS 160.

According to some embodiments, SCEF/SCS 160 may expose a new representational state transfer (REST) API 520 (e.g. defined by the Open Mobile Alliance), or other APIs. For example, various 3GPP interface definitions permitting SCEF/SCS 160 to access services or capabilities at either new or existing 3GPP network elements are also contemplated by this disclosure. The choice of which protocols to specify for such 3GPP interfaces—RESTful APIs 520, a Diameter-based API 530, an extensible markup language (XML) over hypertext transfer protocol (HTTP) 540, or other API 550 protocols—depends on multiple factors including, but not limited to, the features of a specific interface or the ease of exposure of the desired traffic pattern information. Any of these APIs 161 may be invoked by applications 560 executed by external third-party servers, such as AS 162 or AS 164 (FIG. 1).

In some embodiments, MTC-IWF 150 or other entities may be co-located with SCEF/SCS 160 (as represent by the dashed lines of FIG. 5). In these embodiments, API functionality, such as RESTful API 520, may encompass that of Diameter-based Tsp interface 188. In other embodiments, MTC-IWF 150 is co-located with SCEF/SCS 160, incorporates the SCEF functionality provided by SCEF/SCS 160, but empolys Tsp interface 188 functionality that is exposed (e.g., internally) via Diameter-based API 530. In another example, MME 122 incorporates aspects of SCEF/SCS 160, or it includes an internally or externally exposed API providing a Tx trigger submission interface 570.

Figure 6:
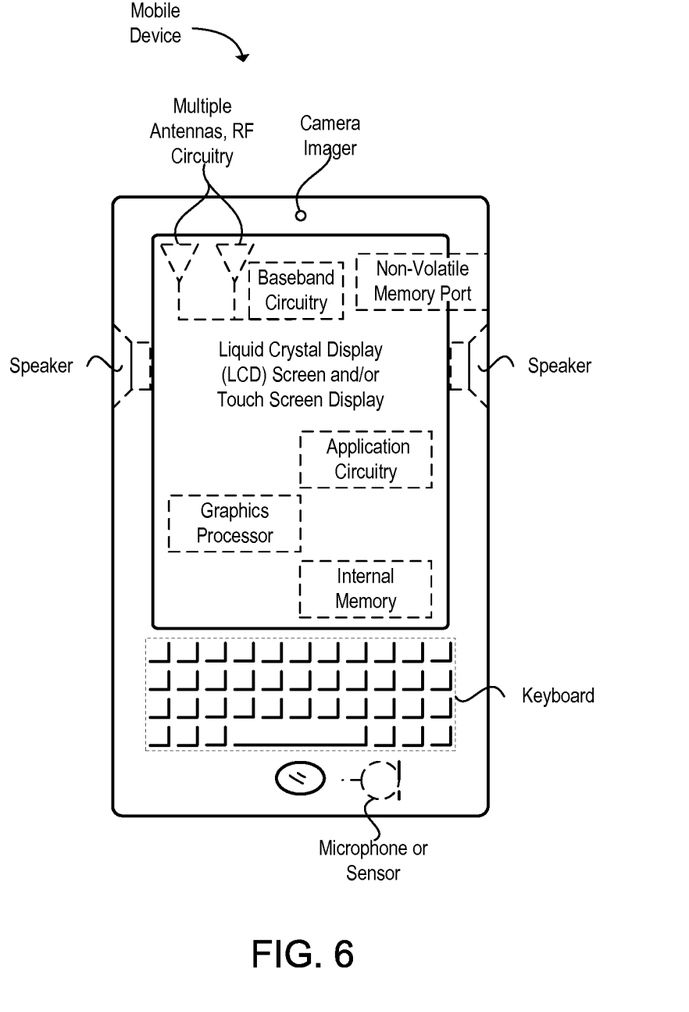
FIG. 6 is a block diagram of a UE.

Embodiments described herein may be implemented into a system using any suitably configured hardware and/or software. FIG. 6 provides an example illustration of a mobile device, commonly deployed as a UE, and referred to as a mobile station (MS), a mobile wireless device, a mobile communication device, a tablet, a handset, or other type of mobile wireless device. The mobile device can include one or more antennas configured to communicate with transmission station, such as a base station (BS), an eNB, a base band unit (BBU), a remote radio head (RRH), a remote radio equipment (RRE), a relay station (RS), a radio equipment (RE), or other type of wireless wide area network (WWAN) access point.

The UE comprises radio frequency (RF) circuitry, baseband circuitry, application circuitry, memory/storage, a display, a camera, a sensor, and an input/output (I/O) interface, coupled with each other at least as shown.

The application circuitry may include circuitry such as, but not limited to, one or more single-core or multi-core processors. The processor(s) may include any combination of general-purpose processors and dedicated processors (e.g., graphics processors, application processors, etc.). The processors may be coupled with memory/storage and configured to execute instructions stored in the memory/storage to enable various applications and/or operating systems running on the system.

The baseband circuitry may include circuitry such as, but not limited to, one or more single-core or multi-core processors. The processor(s) may include a baseband processor. The baseband circuitry may handle various radio control functions that enable communication with one or more radio networks via the RF circuitry. The radio control functions may include, but are not limited to, signal modulation, encoding, decoding, radio frequency shifting, etc.

In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), and/or a wireless personal area network (WPAN). The mobile device can be configured to communicate using at least one wireless communication standard including 3GPP LTE, WiMAX, High Speed Packet Access (HSPA), Bluetooth, and Wi-Fi. The mobile device can communicate using separate antennas for each wireless communication standard or shared antennas for multiple wireless communication standards. Embodiments in which the baseband circuitry is configured to support radio communications of more than one wireless protocol may be referred to as multi-mode baseband circuitry.

In various embodiments, baseband circuitry may include circuitry to operate with signals that are not strictly considered as being in a baseband frequency. For example, in some embodiments, baseband circuitry may include circuitry to operate with signals having an intermediate frequency, which is between a baseband frequency and a radio frequency.

RF circuitry may enable communication with wireless networks using modulated electromagnetic radiation through a non-solid medium. In various embodiments, the RF circuitry may include switches, filters, amplifiers, etc. to facilitate the communication with the wireless network.

In various embodiments, RF circuitry may include circuitry to operate with signals that are not strictly considered as being in a radio frequency. For example, in some embodiments, RF circuitry may include circuitry to operate with signals having an intermediate frequency, which is between a baseband frequency and a radio frequency.

In some embodiments, some or all of the constituent components of the baseband circuitry, the application circuitry, and/or the memory/storage may be implemented together on a system on a chip (SOC) or other controller circuitry. Controller circuitry may include circuitry configured to perform the techniques introduced above, and can be implemented by programmable circuitry programmed or configured by software and/or firmware, or implemented entirely by special-purpose hardwired circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Memory/storage may be used to load and store data and/or instructions, for example, for the operating system. Memory/storage for one embodiment may include any combination of suitable volatile memory (e.g., dynamic random access memory (DRAM)) and/or non-volatile memory (e.g., flash memory).

In various embodiments, an input/output (I/O) interface may include one or more user interfaces designed to enable user interaction with the system and/or peripheral component interfaces designed to enable peripheral component interaction with the system. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, a sensor may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display may include a display (e.g., a liquid crystal display, a touch screen display, etc.). The display screen may be a liquid crystal display (LCD) screen or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities.

In various embodiments, the system may be a mobile computing device such as, but not limited to, a laptop computing device, a tablet computing device, a netbook, an Ultrabook™, a smartphone, etc. In various embodiments, the system may have more or fewer components, and/or different architectures.

Figure 7:
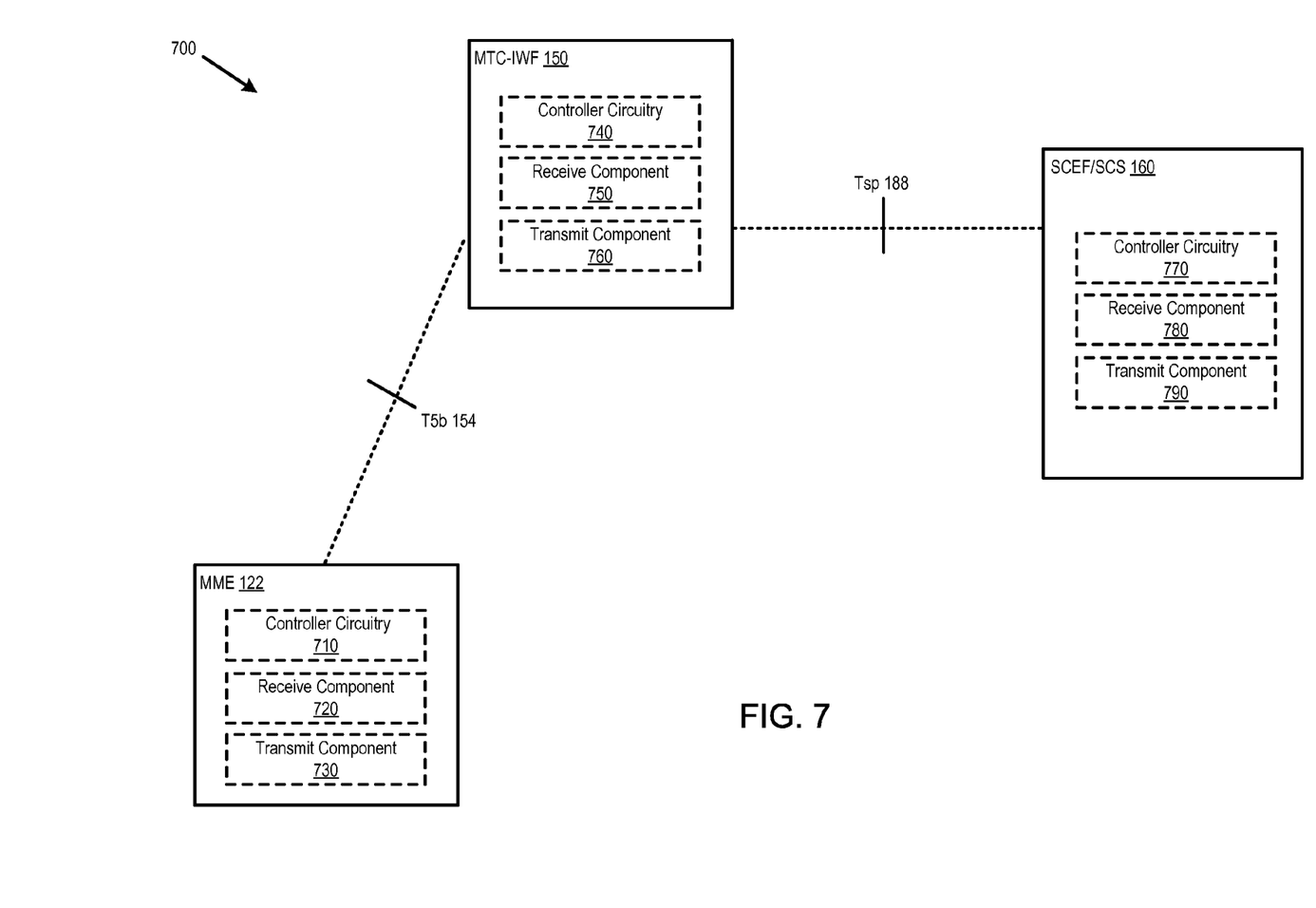
FIG. 7 is a block diagram of a subsystem of the wireless network architecture of FIG. 1, the subsystem including a mobility management entity (MME), an MTC-interworking function (MTC-IWF), a services capability server (SCS) optionally including a service capability exposure function (SCEF), and interfaces to the MTC-IWF.

FIG. 7 illustrates a block diagram of a subsystem 700 showing in greater detail the internal components of MME 122, MTC-IWF 150, and SCEF/SCS 160 of FIG. 1. Each of MME 122, MTC-IWF 150, and SCEF/SCS 160 may comprise a computer-implemented apparatus having controller circuitry arranged to execute one or more software functions for receive and transmit components. Specifically, FIG. 7 shows MME 122 as including controller circuitry 710, receive component 720, and transmit component 730. MTC-IWF 150 includes controller circuitry 740, receive component 750, and transmit component 760. SCEF/SCS 160 includes controller circuitry 770, receive component 780, and transmit component 790. The aforementioned controller circuitry, receive components, and transmit components may be available from various vendors of commercially available equipment and logic components, such as, for example, components similar to those described previously with reference to FIG. 6.

According to some examples, each of MME 122, MTC-IWF 150, and SCEF/SCS 160 may be implemented in network equipment capable of operating in compliance with one or more 3GPP LTE Specifications including LTE-A in order to communicate CN assistance information messages (e.g., ATCI, FIG. 4) through MTC-IWF 150 by virtue of Tsp and T5 triggering, in which case controller circuitry formats and interprets the messages, and thereby controls the transmit and receive components so as to send, receive, and respond to the messages.

Although the apparatuses shown in FIG. 7 are each depicted as block diagrams having three internal components, it is understood that these apparatuses may include additional components and they may be arranged in various configurations as desired in some implementations. For example, MTC-IWF 150 may be co-located with SCEF/SCS 160. Furthermore, MTC-IWF 150 may include functional components or modules (e.g., implemented in software executed by computer logic) to perform network authorization, device trigger handling, security functions, and reference point handling.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, one or more processors may be configured with instructions stored on a computer-readable storage device. The following are additional example embodiments.

Example 1

A machine type communication interworking function (MTC-IWF) apparatus for operation in a core network of a long term evolution (LTE) wireless network, the MTC-IWF apparatus comprising: a receive component to receive from a services capability server (SCS), a request message including application communication pattern information and a request that the MTC-IWF apparatus provide the application communication pattern information to a mobility management entity (MME); and a device trigger submission component to directly submit the application communication pattern information from the MTC-IWF to the MME.

Example 2

The MTC-IWF apparatus of example 1, further comprising a transmit component to transmit, through a Tsp interface from the MTC-IWF apparatus to the SCS, a Diameter-based answer message indicating whether the MME received the application communication pattern information.

Example 3

The MTC-IWF apparatus of example 2, in which the transmit component is configured to transmit the Diameter-based answer message having an Internet Assign Number Authority (IANA) Diameter Header code value representing a Device-Action-Answer (DAA) command.

Example 4

The MTC-IWF apparatus of example 2, in which the transmit component is configured to transmit the Diameter-based answer message having an Internet Assign Number Authority (IANA) Diameter Header code value representing a Device-Notification-Answer (DNA) command.

Example 5

The MTC-IWF apparatus of example 2, in which the transmit component is configured to transmit the Diameter-based answer message by indicating it is an Application-Traffic-Configuration-Information (ATCI) command.

Example 6

The MTC-IWF apparatus of any of examples 1-5, in which the request message comprises a Diameter-based request message, and in which the receive component is configured to receive the Diameter-based request message having an Internet Assign Number Authority (IANA) Diameter Header code value representing a Device-Action-Request (DAR) command including the application communication pattern information.

Example 7

The MTC-IWF apparatus of any of examples 1-5, in which the request message comprises a Diameter-based request message, and in which the receive component is configured to receive the Diameter-based request message having an Internet Assign Number Authority (IANA) Diameter Header code value representing a Device-Notification-Request (DNR) command including the application communication pattern information.

Example 8

The MTC-IWF apparatus of any of examples 1-5, in which the request message comprises a Diameter-based request message, and in which the receive component is configured to receive the Diameter-based request message having an Internet Assign Number Authority (IANA) Diameter Header code value representing a Device-Information-Report (DIR) command including the application communication pattern information.

Example 9

The MTC-IWF apparatus of any of examples 1-5, in which the request message comprises a Diameter-based request message, and in which the receive component is configured to receive the Diameter-based request message having an Internet Assign Number Authority (IANA) Diameter Header code value representing an Application-Traffic-Configuration-Information (ATCI) command.

Example 10

The MTC-IWF apparatus of any of examples 1-9, in which the receive component is configured to expose a representational state transfer (REST) application programming interface (API) for receiving the request message independent of a Tsp interface.

Example 11

A method performed by a machine type communication interworking function (MTC-IWF) apparatus for operation in a core network of a long term evolution (LTE) wireless network, the method comprising: receiving from a services capability server (SCS), a request message including application communication pattern information and a request that the MTC-IWF apparatus provide the application communication pattern information to a mobility management entity (MME); and submitting the application communication pattern information from the MTC-IWF to the MME.

Example 12

The method of example 11, further comprising transmitting, through a Tsp interface from the MTC-IWF apparatus to the SCS, a Diameter-based answer message indicating whether the MME received the application communication pattern information.

Example 13

The method of example 12, in which the transmitting comprising transmitting the Diameter-based answer message having an Internet Assign Number Authority (IANA) Diameter Header code value representing a Device-Action-Answer (DAA) command.

Example 14

The method of example 12, in which the transmitting comprising transmitting the Diameter-based answer message having an Internet Assign Number Authority (IANA)

Diameter Header code value representing a Device-Notification-Answer (DNA) command.

Example 15

The method of example 12, in which the transmitting comprising transmitting the Diameter-based answer message by indicating it is an Application-Traffic-Configuration-Information (ATCI) command.

Example 16

The method of any of examples 11-15, in which the receiving comprises receiving the request message including a Diameter-based request message having an Internet Assign Number Authority (IANA) Diameter Header code value representing a Device-Action-Request (DAR) command including the application communication pattern information.

Example 17

The method of any of examples 11-15, in which the receiving comprises receiving the request message including a Diameter-based request message having an Internet Assign Number Authority (IANA) Diameter Header code value representing a Device-Notification-Request (DNR) command including the application communication pattern information.

Example 18

The method of any of examples 11-15, in which the receiving comprises receiving the request message including a Diameter-based request message having an Internet Assign Number Authority (IANA) Diameter Header code value representing a Device-Information-Report (DIR) command including the application communication pattern information.

Example 19

The method of any of examples 11-15, in which the receiving comprises receiving the request message including a Diameter-based request message having an Internet Assign Number Authority (IANA) Diameter Header code value representing an Application-Traffic-Configuration-Information (ATCI) command.

Example 20

The method of any of examples 11-19, in which the receiving comprises receiving the request message though a representational state transfer (REST) application programming interface (API) that is independent of a Tsp interface.

Example 21

A mobility management entity (MME) for dynamically receiving application communication pattern information associated with a user equipment (UE) device in a long term evolution (LTE) wireless network, the MME comprising: a communication port to receive, from a machine type communication interworking function (MTC-IWF) node, application communication pattern information provided by a service capability exposure function (SCEF) or a services capability server (SCS) for representing communication patterns of an MTC application in operative association with the UE; and a transmitter device for communicating with an evolved universal terrestrial radio access network node B (eNB) so as to provide the application communication pattern information to the eNB.

Example 22

The MME of example 21, in which the communication port is configured for communication over a T5 interface, and in which the communication port is configured to receive the application communication pattern information during a T5 device trigger procedure initiated by the MTC-IWF node.

Example 23

The MME of any one of examples 21-22, further comprising circuitry configured to identify from the application communication pattern information an attribute value pair (AVP) including a traffic activity parameter of the application communication pattern information.

Example 24

The MME of example 23, in which the AVP includes at least one of traffic type, traffic direction, Inter-Arrival Time (IAT), sub-IAT, packet size/length, time window allowed to transmit, service quality of service, service priority, or an Application-Port-Identifier AVP.

Example 25

The MME of any one of examples 21-24, further comprising circuitry configured to provide the application communication pattern information to the eNB in response to S1 establishment.

Example 26

The MME of any one of examples 21-25, further comprising circuitry configured to provide the application communication pattern information to the eNB in response to a predetermined timer value for updating the eNB.

Example 27

A method performed by a mobility management entity (MME) for dynamically receiving application communication pattern information associated with a user equipment (UE) device in a long term evolution (LTE) wireless network, the method comprising: receiving, from a machine type communication interworking function (MTC-IWF) node, application communication pattern information provided by a service capability exposure function (SCEF) or a services capability server (SCS) for representing communication patterns of an MTC application in operative association with the UE; and communicating with an evolved universal terrestrial radio access network node B (eNB) so as to provide the application communication pattern information to the eNB.

Example 28

The method of example 27, in which the receiving comprises receiving over a T5 interface the application communication pattern information during a T5 device trigger procedure initiated by the MTC-IWF node.

Example 29

The method of any one of examples 27-28, further comprising identifying from the application communication pattern information an attribute value pair (AVP) including a traffic activity parameter of the application communication pattern information.

Example 30

The method of example 29, in which the AVP includes at least one of traffic type, traffic direction, Inter-Arrival Time (IAT), sub-IAT, packet size/length, time window allowed to transmit, service quality of service, service priority, or an Application-Port-Identifier AVP.

Example 31

The method of any one of examples 27-30, further comprising providing the application communication pattern information to the eNB in response to S1 establishment.

Example 32

The method of any one of examples 27-31, providing the application communication pattern information to the eNB in response to a predetermined timer value for updating the eNB.

Example 33

A method for providing core network (CN) assistance information to a mobility management entity (MME) operating in compliance with one or more 3rd Generation Partnership Project (3GPP) long term evolution (LTE) standards including LTE Advanced (LTE-A), the method comprising: receiving at a service capability exposure function (SCEF) or a service capability server (SCS), a first command from an application server (AS) through an application programming interface (API) exposed by the SCEF/SCS, the first command including application communication pattern information; communicating with a machine type communication interworking function (MTC-IWF) entity to convey the application communication pattern information to the MTC-IWF entity and thereby cause the MTC-IWF entity to submit the application communication pattern information to the MME; and receiving a second command from the MTC-IWF entity, the second command indicating whether the application communication pattern information was successfully delivered to the MME.

Example 34

The method of example 33, further comprising receiving the second command in the form of a Device-Action-Answer (DAA) command.

Example 35

The method of example 33, further comprising receiving the second command in the form of a Device-Information-Answer (DIA) command.

Example 36

The method of example 33, in which the MTC-IWF entity is co-located with the SCEF/SCS such that the communicating includes an internal Tsp trigger submission.

Example 37

Machine-readable storage including machine-readable instructions to, when executed, implement a method as set forth in any of examples 11-20 or 27-36.

Example 38

A system comprising means for performing a method as set forth in any of examples 11-20 or 27-36.

It will be understood by skilled persons that many changes may be made to the details of the above-described embodiments without departing from the underlying principles of the invention. The scope of the present invention should, therefore, be determined only by the following claims.

The invention claimed is:

1. A machine type communication interworking function (MTC-IWF) apparatus for operation in a core network of a long term evolution (LTE) wireless network, the MTC-IWF apparatus comprising:
   a Tsp interface to receive, from a services capability server (SCS), a request message including application communication pattern information and a request that the MTC-IWF apparatus provide the application communication pattern information to a mobility management entity (MME); and
   a T5 interface to directly submit the application communication pattern information from the MTC-IWF to the MME, in which the Tsp interface is configured to transmit, from the MTC-IWF apparatus to the SCS, a Diameter-based answer message indicating whether the MME received the application communication pattern information, and in which the Tsp interface is further configured to transmit the Diameter-based answer message by indicating it is an Application-Traffic-Configuration-Information (ATCI) command.

2. The MTC-IWF apparatus of claim 1, in which the Tsp interfaces is further configured to transmit the Diameter-based answer message having an Internet Assign Number Authority (IANA) Diameter Header code value representing a Device-Action-Answer (DAA) command.

3. The MTC-IWF apparatus of claim 1, in which the Tsp interface is further configured to transmit the Diameter-based answer message having an Internet Assign Number Authority (IANA) Diameter Header code value representing a Device-Notification-Answer (DNA) command.

4. The MTC-IWF apparatus of claim 1, in which the request message comprises a Diameter-based request message, and in which the Tsp interface is configured to receive the Diameter-based request message having an Internet Assign Number Authority (IANA) Diameter Header code value representing a Device-Action-Request (DAR) command including the application communication pattern information.

5. The MTC-IWF apparatus of claim 1, in which the request message comprises a Diameter-based request message, and in which the Tsp interface is configured to receive the Diameter-based request message having an Internet Assign Number Authority (IANA) Diameter Header code value representing a Device-Notification-Request (DNR) command including the application communication pattern information.

6. The MTC-IWF apparatus of claim 1, in which the request message comprises a Diameter-based request message, and in which the Tsp interface is configured to receive the Diameter-based request message having an Internet Assign Number Authority (IANA) Diameter Header code value representing a Device-Information-Report (DIR) command including the application communication pattern information.

7. The MTC-IWF apparatus of claim 1, in which the request message comprises a Diameter-based request message, and in which the Tsp interface is configured to receive the Diameter-based request message having an Internet Assign Number Authority (IANA) Diameter Header code value representing an ATCI command type.

8. The MTC-IWF apparatus of claim 1, further comprising a network communications interface configured to expose a representational state transfer (REST) application programming interface (API) for receiving the request message independent of the Tsp interface.

9. A mobility management entity (MME) for dynamically receiving application communication pattern information associated with a user equipment (UE) device in a long term evolution (LTE) wireless network, the MME comprising:
a communication port to receive, from a machine type communication interworking function (MTC-IWF) node, application communication pattern information provided by a service capability exposure function (SCEF) or a services capability server (SCS) for representing communication patterns of an MTC application in operative association with the UE, in which the communication port is configured for communication over a T5 interface, and in which the communication port is configured to receive the application communication pattern information during a T5 device trigger procedure initiated by the MTC-IWF node;
a transmitter device communicatively couplable with an evolved universal terrestrial radio access network node B (eNB) and configured to provide the application communication pattern information to the eNB; and
circuitry configured to identify from the application communication pattern information an attribute value pair (AVP) including a traffic activity parameter of the application communication pattern information.

10. The MME of claim 9, in which the AVP includes at least one of traffic type, traffic direction, Inter-Arrival Time (IAT), sub-IAT, packet size/length, time window allowed to transmit, service quality of service, service priority, or an Application-Port-Identifier AVP.

11. The MME of claim 9, further comprising circuitry configured to provide the application communication pattern information to the eNB in response to S1 establishment.

12. The MME of claim 9, further comprising circuitry configured to provide the application communication pattern information to the eNB in response to a predetermined timer value for updating the eNB.

13. A method for providing core network (CN) assistance information to a mobility management entity (MME) operating in compliance with one or more 3rd Generation Partnership Project (3GPP) long term evolution (LTE) standards including LTE-Advanced (LTE-A), the method comprising:
receiving at a service capability exposure function (SCEF) or a service capability server (SCS), a first command from an application server (AS) through an application programming interface (API) exposed by the SCEF/SCS, the first command including application communication pattern information;
communicating with a machine type communication interworking function (MTC-IWF) entity to convey the application communication pattern information to the MTC-IWF entity and thereby cause the MTC-IWF entity to submit the application communication pattern information to the MME; and
receiving a second command from the MTC-IWF entity, the second command indicating whether the application communication pattern information was successfully delivered to the MME.

14. The method of claim 13, further comprising receiving the second command in the form of a Device-Action-Answer (DAA) command.

15. The method of claim 13, further comprising receiving the second command in the form of a Device-Information-Answer (DIA) command.

16. The method of claim 13, in which the MTC-IWF entity is co-located with the SCEF/SCS, and the communicating comprising an internal Tsp trigger submission for the co-located MTC-IWF and SCEF/SCS.

* * * * *